United States Patent
Beaudoin

(10) Patent No.: US 9,533,737 B2
(45) Date of Patent: Jan. 3, 2017

(54) SHAFT AND ACTUATOR FOR RETRACTABLE SNOWMOBILE SKI WHEEL SYSTEM AND METHOD OF USING THE SAME

(71) Applicant: Denis Beaudoin, Drummondville (CA)

(72) Inventor: Denis Beaudoin, Drummondville (CA)

(73) Assignee: INVESTISSEMENTS D. BEAUDOIN INC. (CA)

( * ) Notice: Subject to any disclaimer, the term of this patent is extended or adjusted under 35 U.S.C. 154(b) by 0 days.

(21) Appl. No.: 14/747,506

(22) Filed: Jun. 23, 2015

(65) Prior Publication Data

US 2015/0284050 A1 Oct. 8, 2015

Related U.S. Application Data

(62) Division of application No. 13/462,932, filed on May 3, 2012, now Pat. No. 9,102,382.

(30) Foreign Application Priority Data

Dec. 8, 2008 (CA) ...................................... 2647375

(51) Int. Cl.
*B62B 13/18* (2006.01)
*B62M 27/02* (2006.01)

(52) U.S. Cl.
CPC .............. *B62M 27/02* (2013.01); *B62B 13/18* (2013.01); *B62M 2027/022* (2013.01); *B62M 2027/025* (2013.01); *Y10T 74/20528* (2015.01); *Y10T 403/32614* (2015.01); *Y10T 403/32951* (2015.01)

(58) Field of Classification Search
CPC ... B62M 27/02; B62M 27/021; B62M 27/022; B62M 2027/022; B62M 2027/025; B62B 13/18; Y10T 74/20528; Y10T 403/32614; Y10T 403/32951
USPC .... 280/8, 9, 10, 11, 13, 14, 47.331; 180/209
See application file for complete search history.

(56) References Cited

U.S. PATENT DOCUMENTS

| | | | | | |
|---|---|---|---|---|---|
| 649,177 | A | * | 5/1900 | Regli ...................... | B62B 13/18 280/9 |
| 1,005,379 | A | * | 10/1911 | Walters ................... | B62B 19/04 280/14 |
| 1,999,106 | A | * | 4/1935 | Muller .................... | B60B 33/06 16/34 |
| 7,290,774 | B2 | * | 11/2007 | Despres .................. | B62B 13/18 180/182 |

* cited by examiner

*Primary Examiner* — John Walters
(74) *Attorney, Agent, or Firm* — Brouillette and Partners; Robert Brouillette

(57) ABSTRACT

The present invention provides a retractable wheel system for snowmobile skis. The retractable wheel system of the present invention may be installed on a snowmobile ski without affecting its structural integrity by installing the system on the reinforced portion of the snowmobile ski. When a user circulates in a path with little or no snow, the retractable wheel system is positioned in the extended configuration by the user and the system will automatically return to the retracted configuration when the user returns in a snowy zone. This is realized by using a pre-tensioned spring that will reposition the wheel in the retracted configuration. The spring transmits a rotational movement to the member on which the wheel is fixed.

17 Claims, 12 Drawing Sheets

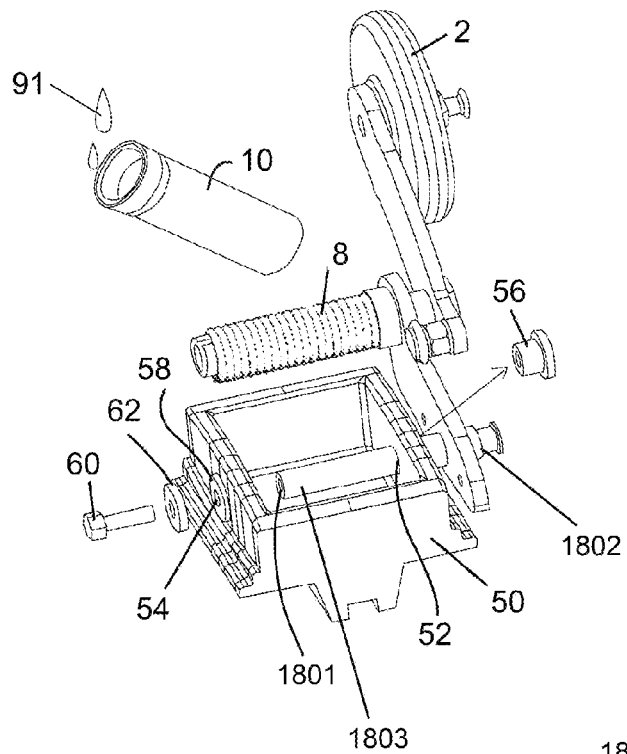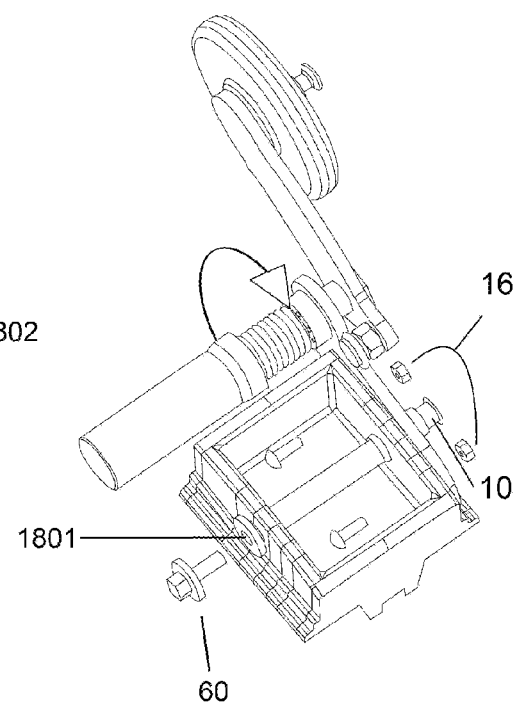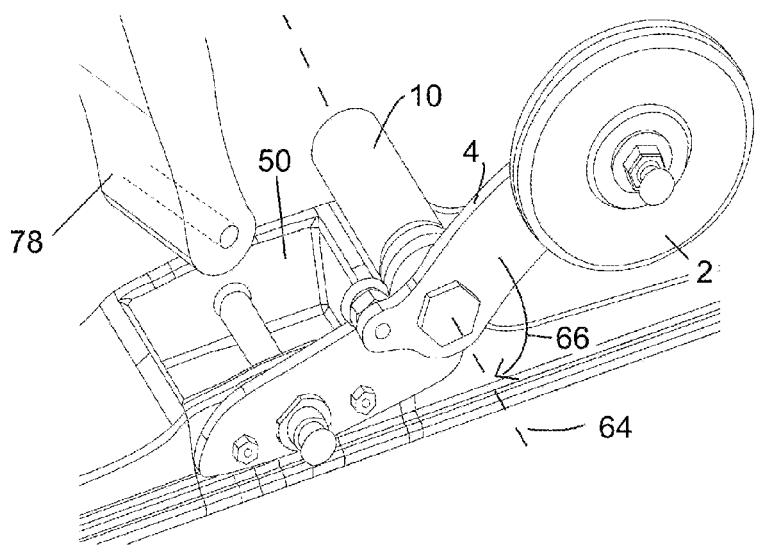

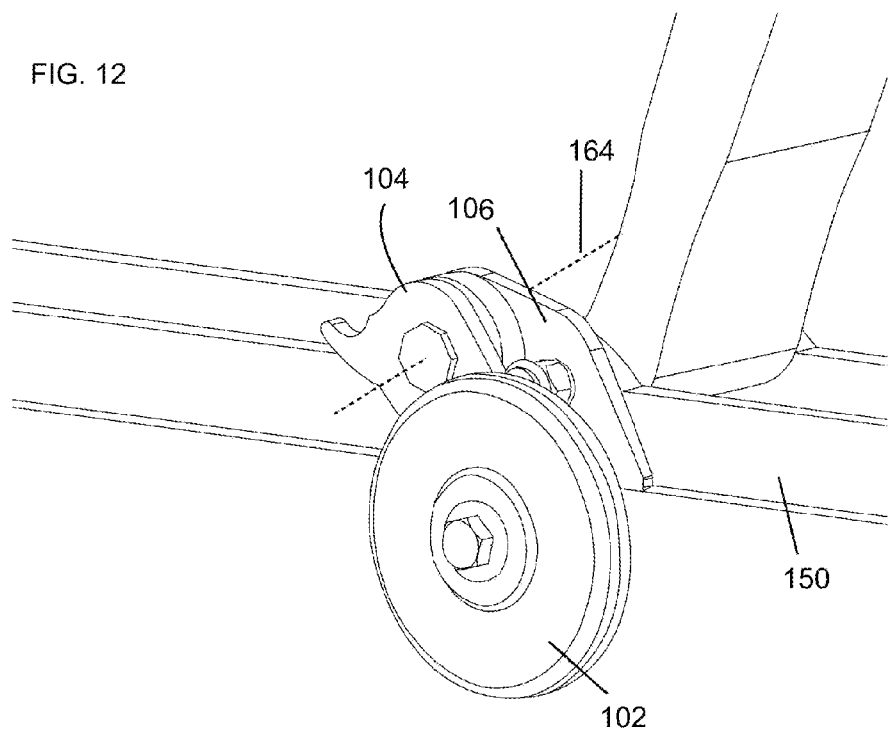
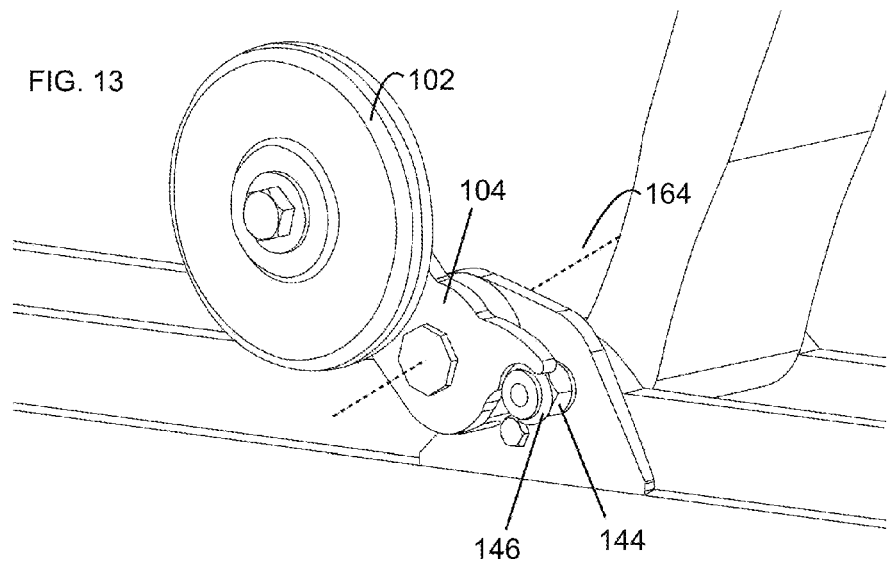

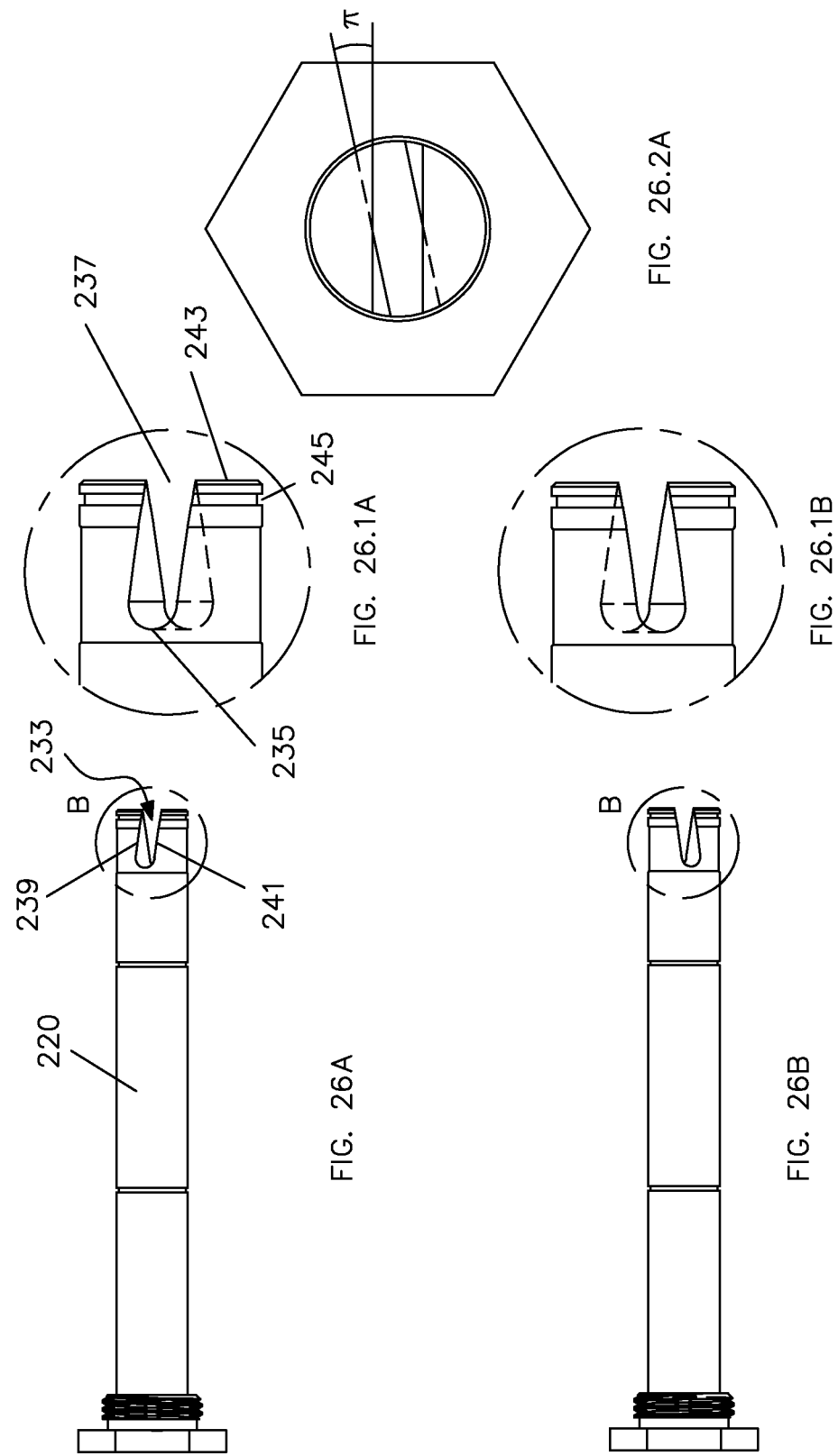

SHAFT AND ACTUATOR FOR RETRACTABLE SNOWMOBILE SKI WHEEL SYSTEM AND METHOD OF USING THE SAME

CROSS-REFERENCE TO RELATED APPLICATIONS

The present patent application is a divisional application of commonly assigned U.S. patent application Ser. No. 13/462,932, itself a continuation application of commonly assigned U.S. patent application Ser. No. 12/633,325, itself claiming the priority of the commonly assigned Canadian Patent Application no. 2,647,375, entitled "Roue retractable pour ski de motoneige" and filed at the Canadian Patent Office on Dec. 8, 2008. The present application claims the benefits of priority of all these prior applications. The disclosures of these prior applications are incorporated herein by reference.

FIELD OF THE INVENTION

The present invention generally relates to vehicles partially supported by one or more skis. More specifically, this invention is related to a snowmobile having a retractable wheel to circulate in a zone with little or no snow.

BACKGROUND OF THE INVENTION

Snowmobiles are vehicles adapted to circulate on snowy or icy surfaces. However, users often have to circulate on surface having little or no snow. These non-snow surfaces are often made from asphalt, concrete, stony ground, for example, which are highly abrasive for the undersurface of the snowmobile ski. Prior art shows some systems in which the user has to install wheels on the skis to circulate on abrasive surface to prevent the undersurface of the ski to contact the abrasive surface.

Disadvantage of such system is that the manipulation to install the wheel is complex and difficult. Indeed, in many of systems provided in prior art, the user has to stop the snowmobile, get down from it and install manually the wheels, pass through the zone with little or no snow, stop again the snowmobile and remove the wheels. These manipulations have for consequence that the users will not install the wheel and pass through the zone with little or no snow on the ski, causing a premature wear of the ski.

Also, in snowy condition, the wheel systems may be jam with snow or ice, increasing the difficulty of the manipulation.

Finally, it is important to consider where the systems are installed on skis. Since the weight of the snowmobile is directly transmitted to the ski, the latter are under high mechanical stresses. In some systems of prior art, fixation holes are practiced in the ski, weakening the ski and causing eventually the breaking of the ski. Since the skis are reinforced where they are attached to the snowmobile, it would be advantageous to install the wheel in this section. Indeed, if the wheels are installed in a non-reinforced zone, the ski will bend, diminishing the contact surface between the snow and the ski. This configuration diminishes the performance of the ski on snow. It also causes an inadequate distribution of the weight of the snowmobile on the ski and a premature wear.

A deformation of the skis may occur if the wheel system is installed on a part of the ski that is not reinforced, causing the ski to bend under the weight of the snowmobile. Furthermore, the wear bar usually install on the undersurface of a ski will be highly affected by such a stress and curvature. It is known that the wear bar is made from carbide having high hardness and thus being highly fragile. As a consequence, the wear bar will become cracked and chipped.

SUMMARY OF THE INVENTION

The aforesaid and other objectives of the present invention are realized by generally providing a retractable wheel system for snowmobile ski, the snowmobile ski being connected to the snowmobile with a kingpin, the kingpin being connected to the snowmobile ski through a first opening and a second opening in the ski, the system having a retracted configuration and an extended configuration, the extended configuration being actuated by a user of the snowmobile and wherein the system is configured to return automatically in the retracted configuration, the system comprising a spring having a first extremity and a second extremity, the aid spring being pre-tensioned at a predetermined amount, a pivoting member connected to the ski and to the spring, the pivoting member being actuated by the spring, a shaft having a first and a second extremity, the shaft comprising a slot at the second extremity, the pivoting member being pivotally mounted along the shaft, and the wherein the first extremity of the spring is inserted in the slot, a connector, the connector being mounted on the second extremity of the shaft, the connector comprising a plurality of holes configured to receive second extremity of the spring, a wheel rotatably connected to the pivoting member; and a stopper.

In a preferred embodiment, the spring is a helical torsion spring. In another embodiment, the spring is of the main-spring type.

In a preferred embodiment, slot in the shaft is perpendicular to the second extremity of the shaft. In another embodiment, the top portion and the bottom portion of the slot of the shaft are at an angle $\pi$, the angle $\pi$ preferably comprised between 10° and 14°.

In another embodiment, the present invention provides a shaft to be used with a spring, the spring having a first and a second extremity, the shaft comprising a slot, wherein the slot has a top portion and a bottom portion, and wherein there is an angle $\pi$ between the bottom portion of the slot and the top portion of the slot, wherein the first extremity of the spring is inserted in said slot, wherein the slot forces the first extremity of the spring towards the bottom portion of the slot when the spring is twisted to be tighter. The angle $\pi$ is comprised between 10° and 14°.

The retractable wheel system of the present invention is easily installed on an existing snowmobile ski. To do so, the transmission arm and the kingpin of the ski are dismounted and the retractable wheel system is fixed to the ski using the kingpin. The retractable wheel system comprises a wheel, a pivoting member, a fixation member and a spring. The fixation member is fixed to the snowmobile ski using the kingpin and is secured with bolt and nut. An important feature of the present invention is the installation of the retractable wheel system using the kingpin to prevent deformation and damage of the ski.

It is to be noted that the fixation member could be omitted if the ski was already equipped with fixation means for the pivoting member.

An advantage of the present invention is that it has little or no effect on the structural integrity of the ski compared to prior art. Indeed, the retractable wheel system of the present invention is installed on the reinforced portion of the ski.

Also, the system is secured with the kingpin thus the force distribution is almost the same as the normal use, i.e. with the skis.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 2a is an exploded view of the fixation system of the embodiment shown in FIG. 1a.

FIG. 3a is an exploded view of the retraction system of the embodiment shown in FIG. 1a.

FIG. 3a is an exploded view of the retraction system of the embodiment shown in FIG. 1b.

FIG. 4a is a partially exploded view of the retractable wheel system of the embodiment shown in FIG. 1a.

FIG. 5a is an isometric view of the retractable wheel system of the embodiment shown in FIG. 1a.

FIG. 6 is an isometric view showing one of the steps to mount the retractable wheel system on a snowmobile ski.

FIG. 7 is an isometric view showing one of the steps to mount the retractable wheel system on a snowmobile ski.

FIG. 8 is an isometric view showing the retractable wheel system of FIG. 1 as mounted on a snowmobile ski.

FIG. 12 is an isometric view of the embodiment of FIG. 9 in an extended configuration.

FIG. 13 is an isometric view of the embodiment of FIG. 9 in a retracted configuration.

FIG. 26a is a side view showing a second embodiment of a shaft, to be used with the left ski of a snowmobile.

FIG. 26b is a side view showing a second embodiment of a shaft, to be used with the right ski of a snowmobile.

FIG. 26.1a is a close-up view of detail b of FIG. 26a.

FIG. 26.1b is a close-up view of detail b of FIG. 26b.

FIG. 26.2a is a top view of the shaft shown in FIG. 26a.

DETAILED DESCRIPTION OF THE PREFERRED EMBODIMENT

A novel retractable wheel system for snowmobile ski will be described hereinafter. Although the invention is described in terms of specific illustrative embodiment(s), it is to be understood that the embodiment(s) described herein are by way of example only and that the scope of the invention is not intended to be limited thereby.

In FIGS. 1 to 6, the figures <<a>> are referring to the retractable wheel system of the left snowmobile ski and the figures <<b>> are referring to the retractable wheel system of the right snowmobile ski. Since the part on left and right sides are symmetric, the same numbers are attributed to identical part of the left and right sides.

Figure 1A:
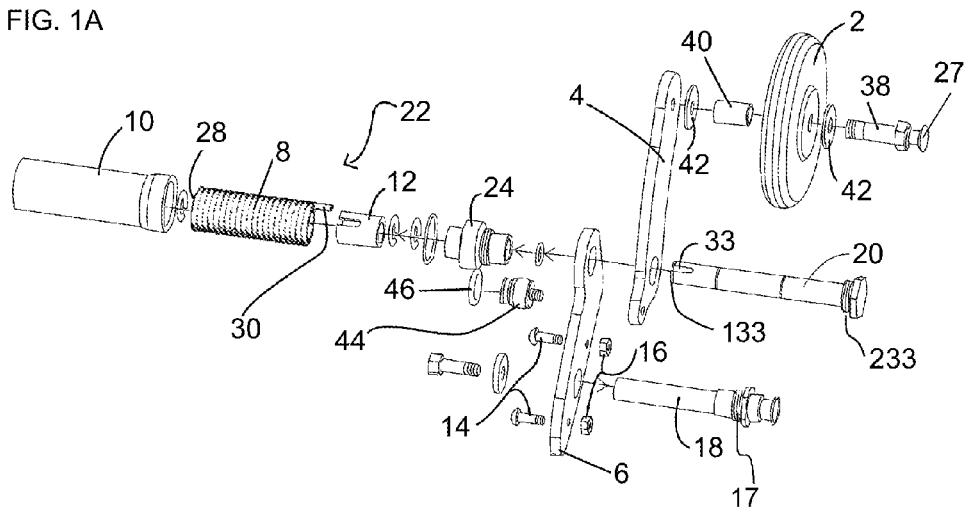
FIG. 1a is an exploded view showing a first embodiment of the retractable wheel system according to the present invention, for the left ski of a snowmobile.
Figure 1B:
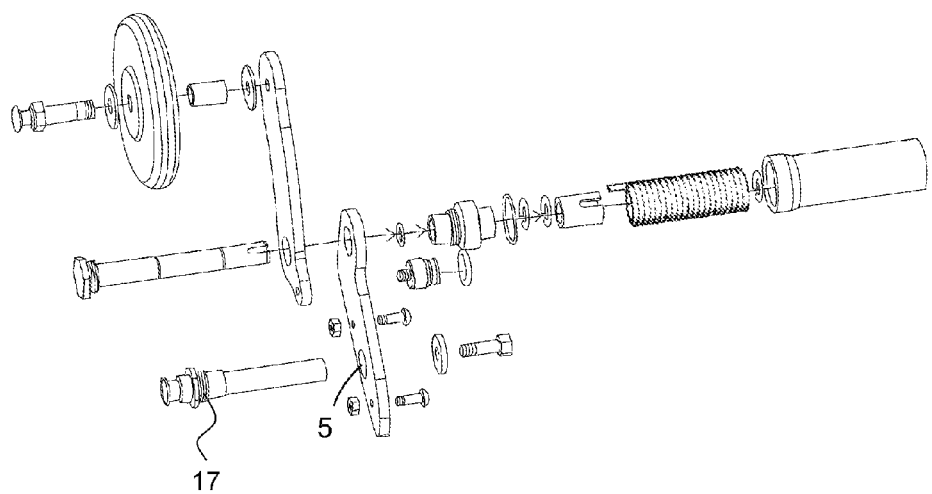
FIG. 1b is an exploded view showing a first embodiment of the retractable wheel system according to the present invention, for the right ski of a snowmobile.

FIG. 1 shows the retractable wheel system comprising a wheel 2, a pivoting member 4, a fixation member 6, and a spring 8. In this preferred embodiment, the fixation member 6 is fixed on the snowmobile ski with the kingpin 18 and the position is secured with bolts 14 and nuts 16, or other appropriate means such as bolt and nut, welding, rivets, etc. . . . The fixation member 6 comprises an opening 5 configured to receive the kingpin 18. The snowmobile ski is connected to the snowmobile with an arm 78 and the kingpin 18. The fixation member 6 provides attachment means for the retractable wheel system so that the system may be retrofit to an existing snowmobile ski.

The spring 8, or helical torsion spring 8, is a spring that works by torsion or twisting, it stores mechanical energy when twisted. The amount of force or torque it exerts is proportional to the amount it is twisted or rotated on itself. To create the pretension in the spring, the latter is subjected to twisting about its longitudinal axis by sideways forces (bending moments) applied to its ends, twisting the spring tighter.

The pivoting member 4 comprises an opening 82 to receive the shaft 20, an opening 84 on which the stopper 44 is installed and an opening 86 on which the wheel 2 is connected. The pivoting member 4 is rotatively connected to the fixation member 6 with the shaft 20. The pivoting member 4 rotates along the longitudinal axis of the shaft 20, under the force applied by the spring 8 (to retract the system) or under a force applied by a user (to extend the system).

Figure 2A:
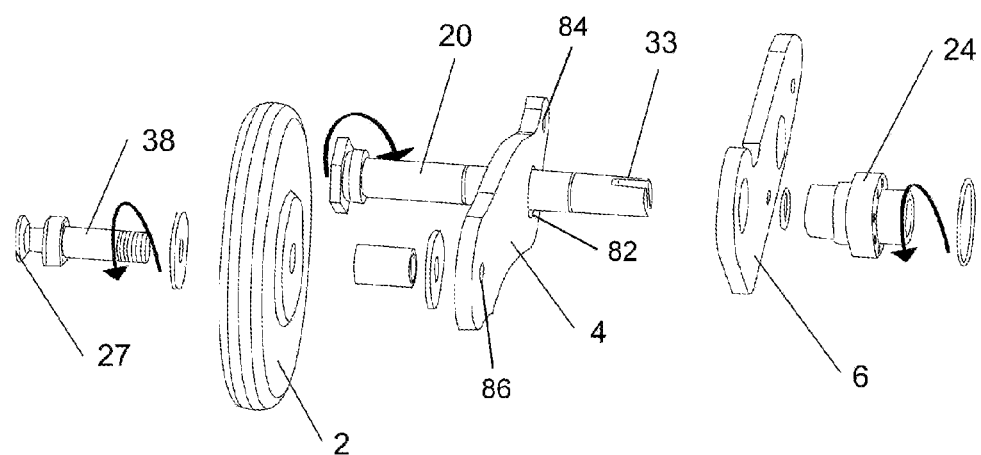
Figure 2B:
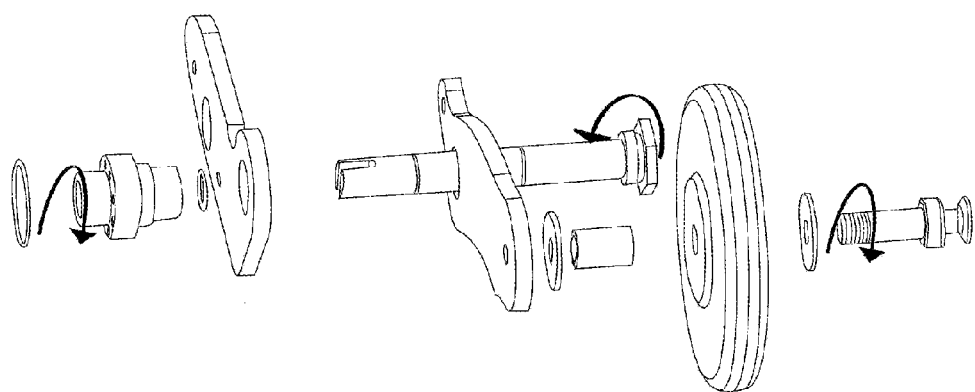
FIG. 2b is an exploded view of the fixation system of the embodiment shown in FIG. 1b.
Figure 3A:
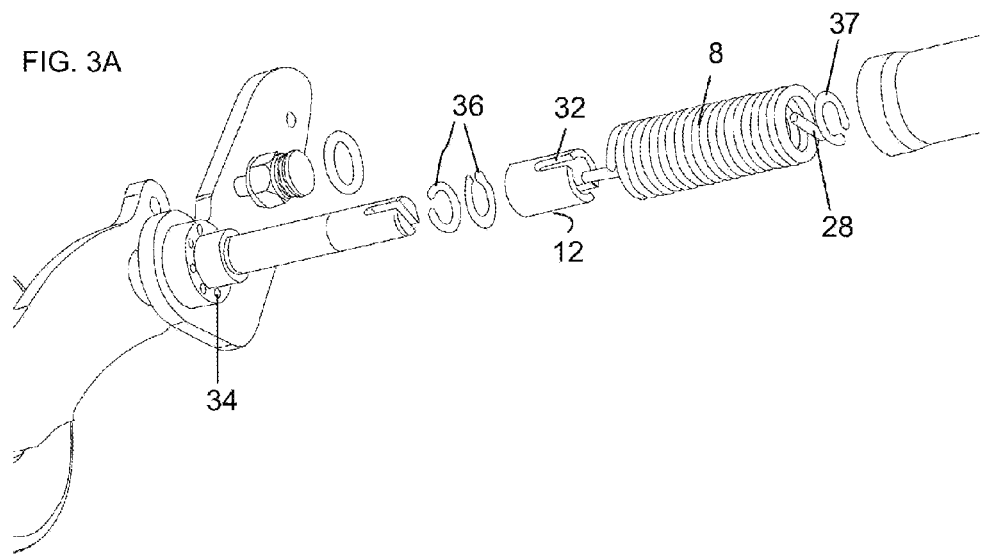
Figure 3B:
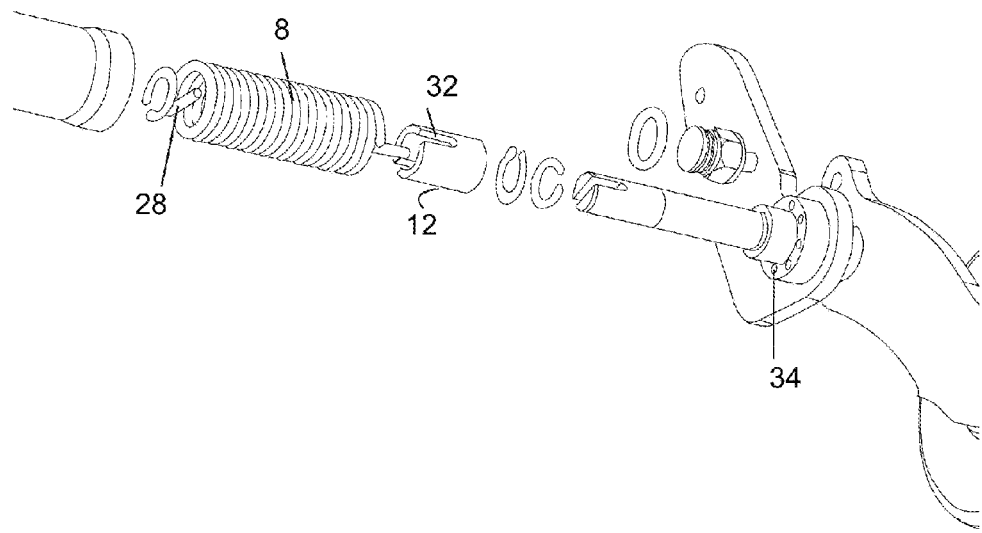

The shaft 20 comprises a first extremity 133 and a second extremity 233. The shaft 20 comprises a slot 33 at its second extremity 233. If a first embodiment, the slot is substantially perpendicular to the second extremity 233, as shown in FIGS. 1 to 3.

The connector 24 is a piece configured to be connected to the first extremity 133 of the shaft 20. The connector 24 comprises a plurality of holes 34, these holes being configured to receive the second extremity 30 of the spring 8. In a preferred embodiment, the connector 24 comprises eleven holes 34. In a preferred embodiment, the connector 24 is screwed to the shaft 20 so that the connector 24 may be changed for reparation or to change the number of holes 34 to provide a plurality of tension levels in the spring. The connector 24 is preferably connected to the pivoting member 4. In the preferred embodiment, the connector 24 is screwed to the pivoting member 4. The connector 24 transmits the rotation induced by the spring 8 to the pivoting member 4.

The adapter 12 is a hollow cylindrical part configured to receive the shaft 20. The adapter 12 comprises a groove 32 configured to receive the first extremity 28 of the spring 8.

The retraction system 22, composed by the spring 8 and the shaft 20, is comprised in the case 10. The case 10 is preferably threaded at its open extremity and may be connected to the connector 24 which is also threaded. The connection between the case 10 and the connector 24 is preferably leakproof.

The first extremity 28 of the spring 8 is folded so it can be inserted into the slot 33 of the shaft 20. The second extremity 30 of the spring 8 is folded to interact with the one of the holes 34 of the connector 24.

To install the spring 8, the first extremity 28 is firstly inserted in the groove 32 of the adapter 12 and the adapter 12 is installed on the shaft 20. It is to be noted that after installation, the first extremity 28 of the spring 8 passes into the slot 33 and into the groove 32. The second extremity 30 is then inserted in one the holes 34. To create the pretension in the spring 8, the spring 8 is rotated or twisted on itself until the desired tension is reached, and the second extremity is then inserted in one of the holes 34 to maintain this pretension in the spring 8.

Retaining rings 36 and 37 are preferably inserted on the shaft 20, on each sides of the spring 8.

The retractable wheel system comprises a stopper 44 which is fixed, in the present embodiment, to the pivoting member 4. An o-ring 46 is installed to the side of the stopper 44. In a retracted configuration, the stopper 44 is in contact with the fixation member 6.

Figure 4A:
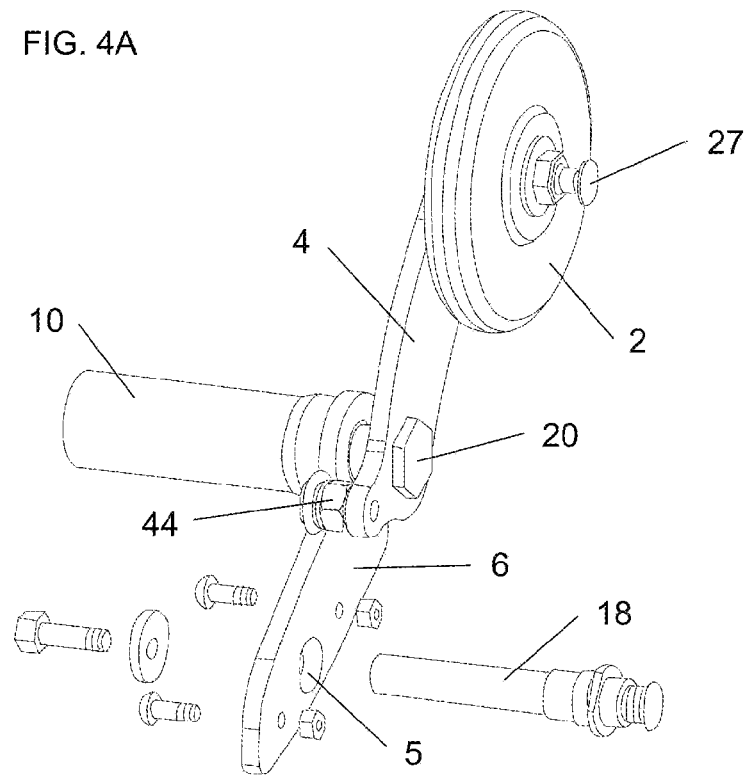
Figure 4B:
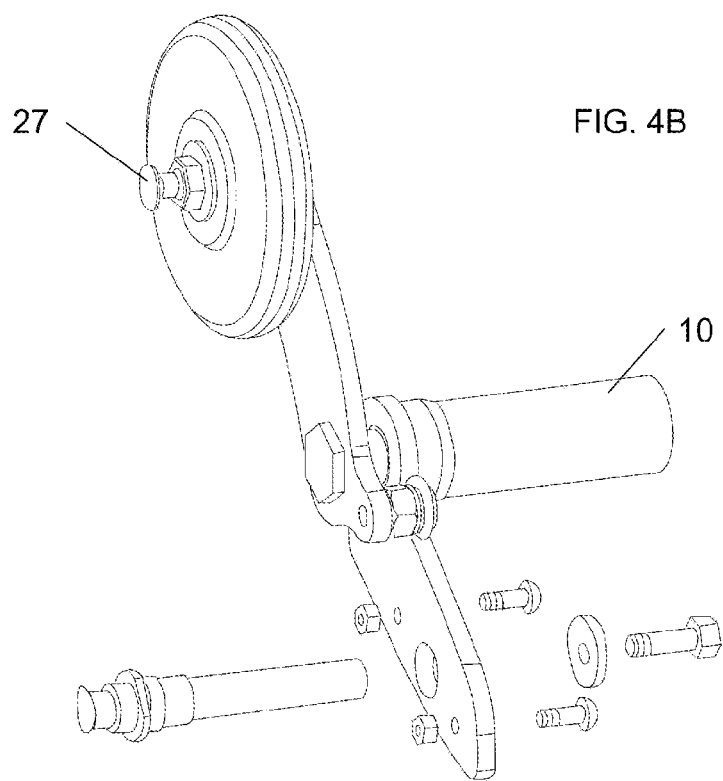
FIG. 4b is a partially exploded view of the retractable wheel system of the embodiment shown in FIG. 1b.
Figure 5A:
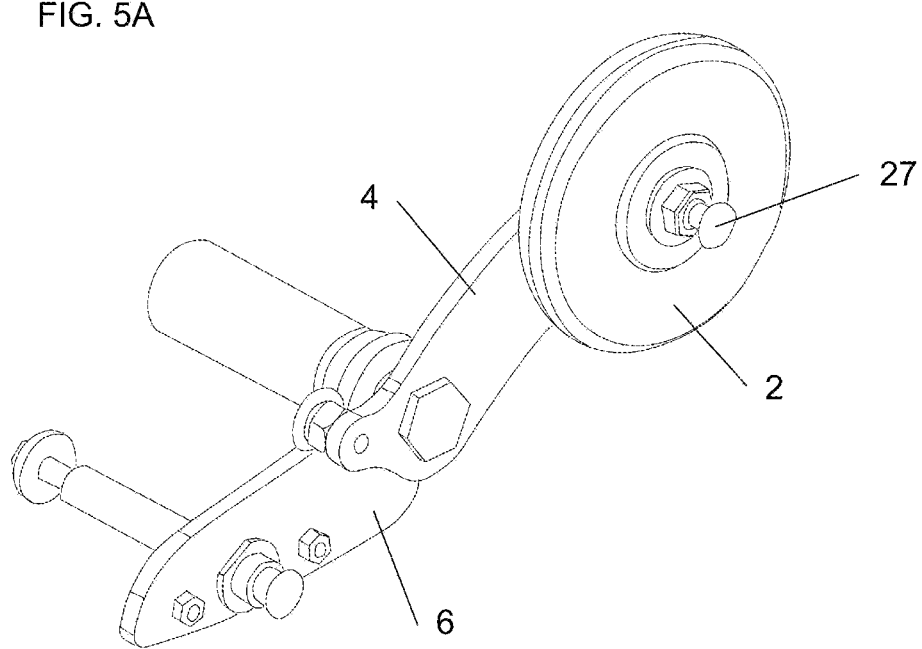
Figure 5B:
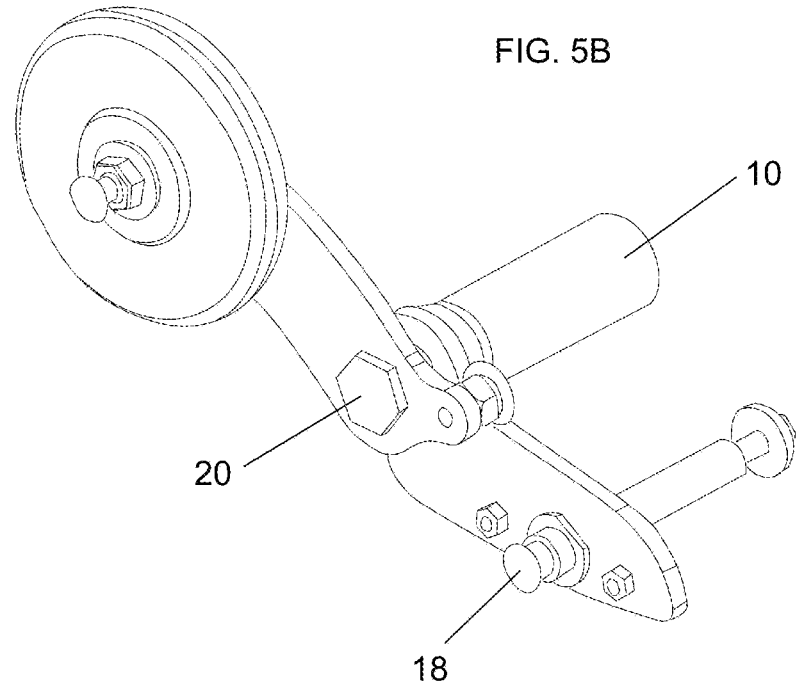
FIG. 5b is an isometric view of the retractable wheel system of the embodiment shown in FIG. 1b.

The wheel 2 is rotatably connected to the pivoting member 4 with the wheel shaft 38. The wheel 2 is mounted on a sleeve 40 and two washers 42 are installed on both sides of the wheel 2, on the wheel shaft 38. As shown in FIG. 4a, in the retracted configuration, the stopper 44 contacts the fixation member. The role of the stopper 44 is to stop the rotation of the pivoting member induced by the spring 8. The stopper 44 also dictates the position of the wheel 2 and of the pivoting member 4 in the retracted position. The tension in the spring 8 causes the pivoting member 4 to rotate counterclockwise (for the right ski) until the stopper 44 contacts the fixation member 6.

FIGS. 6 to 8 show how the retractable wheel system is mounted on a snowmobile ski 50. The kingpin 18 comprises a first 1802 and a second extremity 1803, and a cavity 1801 configured to receive a fastener 60. The kingpin 18 is shaped to be inserted in the first opening 52 and second opening 54 of a snowmobile ski. In a preferred embodiment, the kingpin 18 is shaped as an elongated cylinder comprising a first 1802 and a second extremity 1803. The second extremity 1803 of the kingpin 18 comprises a threaded cavity 1801 configured to receive a compatible threaded fastener 60. The ski 50 usually comprises a first opening 52 and a second opening 54 to receive the kingpin. Bushings 56 and 58 are preferably inserted in the first opening 52 and second opening 54. The kingpin 18 is then inserted in the bushing 56 and 58. The kingpin 18 is then fixed to the ski 50, using a threaded fastener such as bolt 60. A washer 62 is preferably installed between the bushing 54 and the bolt 60. As show in FIGS. 6 and 7, the second extremity 1803 of the body portion of the kingpin 18 does not typically extend beyond the outer side of the opening 54 receiving the second extremity 1803.

Before using the retractable wheel system, an appropriate quantity of protective material and/or lubricant 91 such as synthetic oil is preferably applied in the case 10 to lubricate the mechanism while protecting it from environment such as water, salt, etc. . . .

FIG. 8 shows the retractable wheel system in a retracted configuration, the wheel 2 being located at a horizontal level higher that the undersurface of the ski 50. The pivoting member 4 rotates along the rotation axis 64.

It is to be noted that the shaft or kingpin that is initially used to fix the ski to the snowmobile may be used to fix the retractable wheel system of the present invention. It is also possible to use another shaft conceived for the retractable wheel system.

To move the wheel 2 in an extended configuration the user pushes with his foot on the actuator 27 in the direction indicated by the arrow 66. The user applies the adequate force to overcome the tension in the spring 8. The actuator 27 is a piece used to push downwardly the wheel 2 in an extended configuration and which is easily actuated with a foot. This manipulation moves the wheel so that the bottom of the wheel 2 is at a horizontal level lower than the undersurface of the ski 50. The wheel 2 is then in contact with the ground and is maintained in this configuration because of the weight of the snowmobile, this weight creating a force greater than the tension in the spring 8. It is possible to adjust the distance between the bottom of the wheel 2 and the undersurface of the ski 50, by modifying the dimensions of the parts of the system, for example. This distance may be of 1 inch or 2 inches, for example.

While the user goes back in a snowy zone, the non-snowy surface is gradually or suddenly replaced by a snowy surface. When there is enough snow under the ski 50, i.e. more than the distance between the ski 50 and the bottom of the wheel 2, the tension in the spring 8 will cause the wheel to go back in a retracted configuration. The tension in the spring 8 has to be adjusted to bring back the wheel in a retracted configuration. It is possible to adjust the tension according to the show condition. For example, if the snow is dense or hard, it is possible to adjust the spring 8 to obtain a higher retraction force to insure that the wheel will go back in a retracted configuration.

Figure 9:
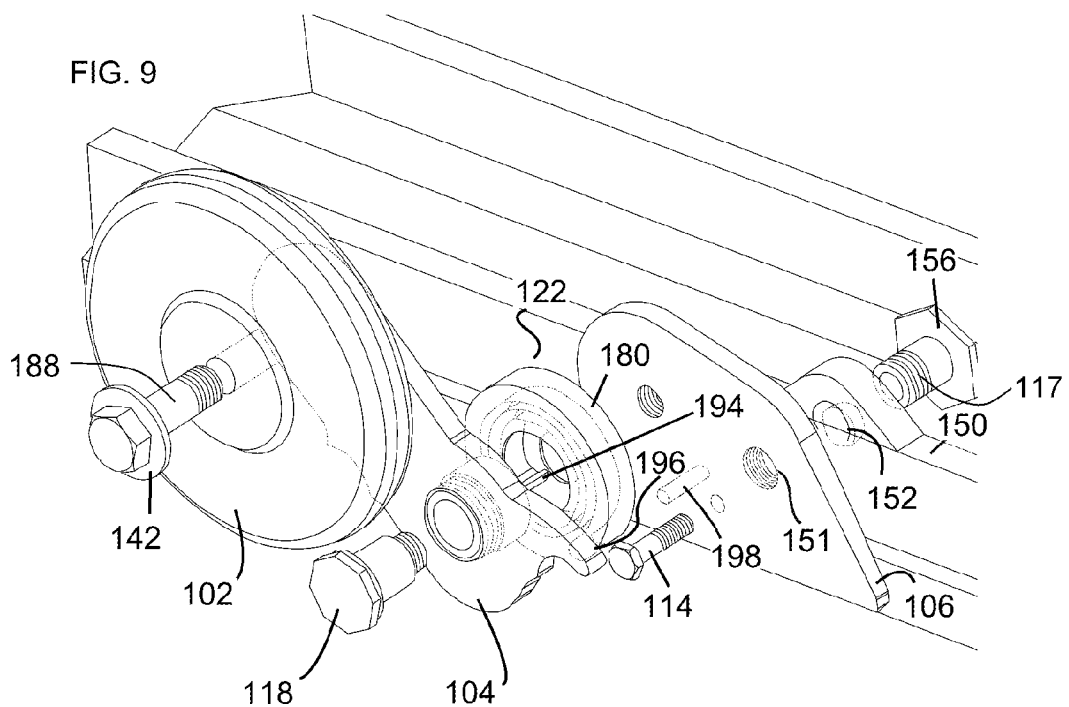
FIG. 9 is an isometric exploded view showing a second embodiment of the retractable wheel system for snowmobile ski.
Figure 10:
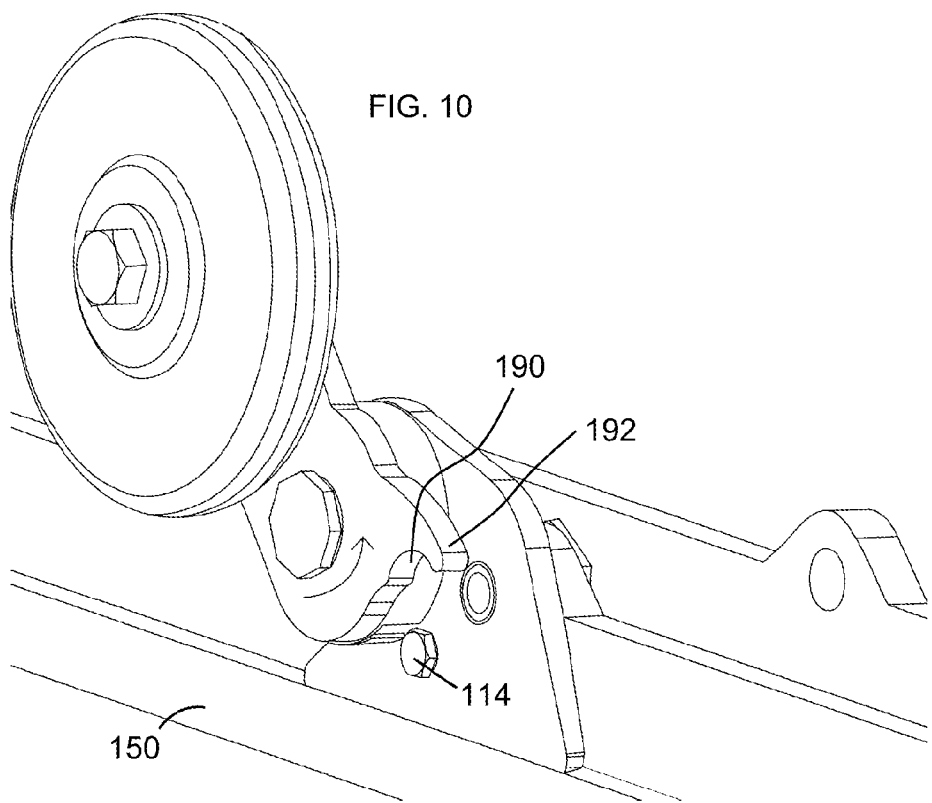
FIG. 10 is an isometric view showing the retractable wheel system of FIG. 9, in a retracted configuration.
Figure 11:
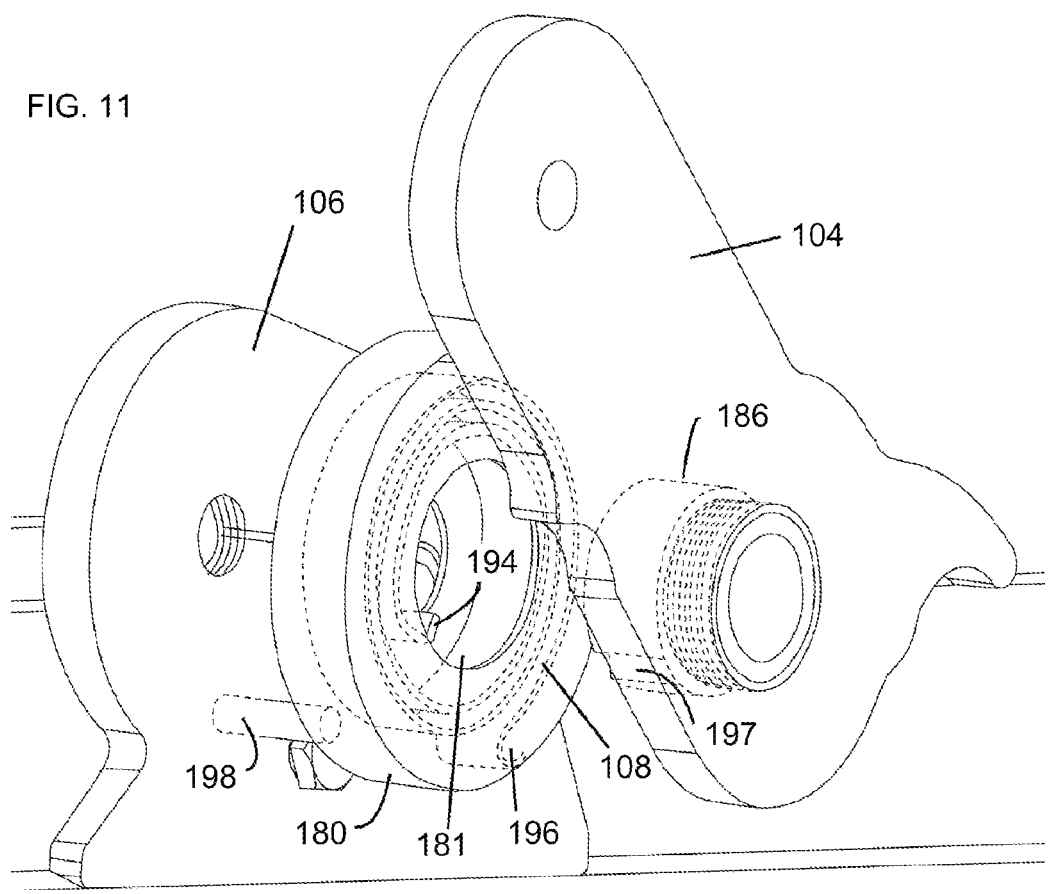
FIG. 11 is an isometric exploded view of the embodiment shown in FIG. 9.
Figure 14:
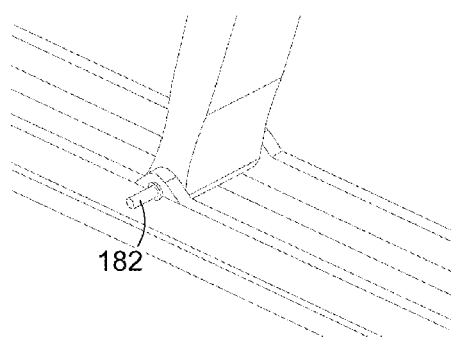
FIG. 14 shows one of the steps to mount the second embodiment of the retractable wheel system on a snowmobile ski.
Figure 15:
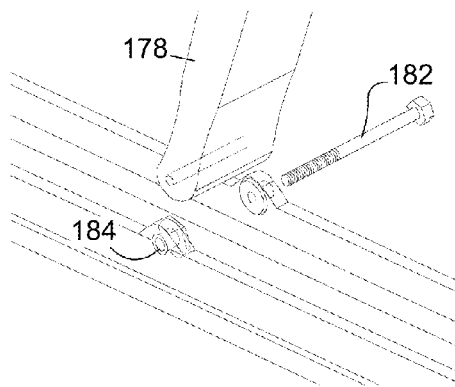
FIG. 15 shows another step to mount the second embodiment of the retractable wheel system on a snowmobile ski.
Figure 16:
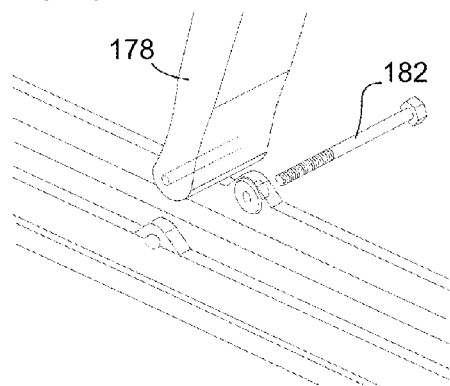
FIG. 16 shows another step to mount the second embodiment of the retractable wheel system on a snowmobile ski.
Figure 17:
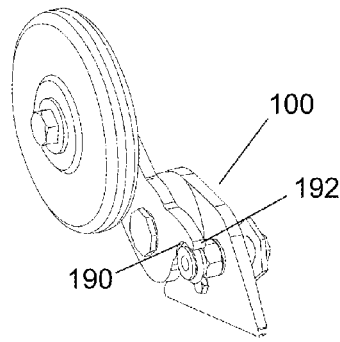
FIG. 17 shows another step to mount the second embodiment of the retractable wheel system on a snowmobile ski.
Figure 18:
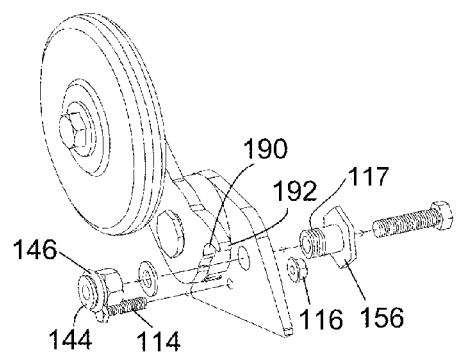
FIG. 18 shows another step to mount the second embodiment of the retractable wheel system on a snowmobile ski.
Figure 19:
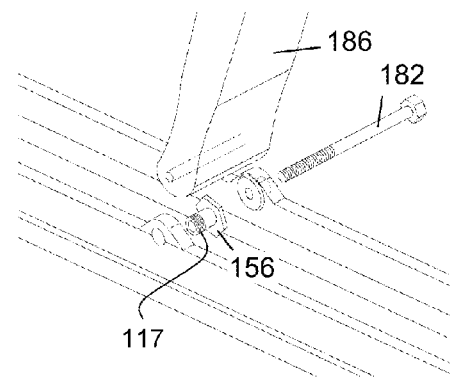
FIG. 19 shows another step to mount the second embodiment of the retractable wheel system on a snowmobile ski.
Figure 20:
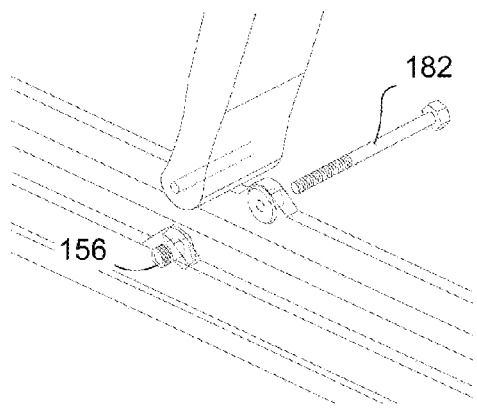
FIG. 20 shows another step to mount the second embodiment of the retractable wheel system on a snowmobile ski.
Figure 21:
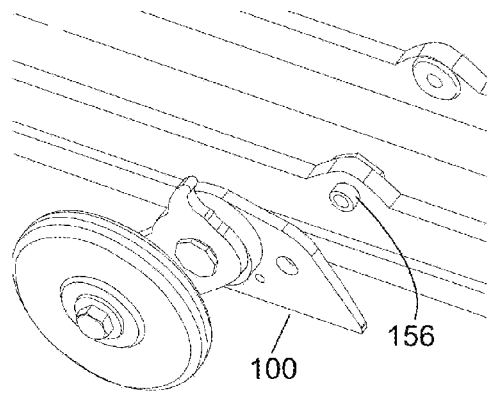
FIG. 21 shows another step to mount the second embodiment of the retractable wheel system on a snowmobile ski.
Figure 22:
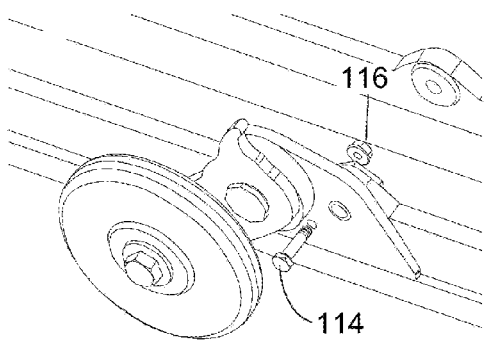
FIG. 22 shows another step to mount the second embodiment of the retractable wheel system on a snowmobile ski.

FIGS. 9 to 25 show a second embodiment of the retractable wheel system according to the present invention. The retractable wheel system comprises a fixation member 106, a pivoting member 104, a wheel 102 and a retraction system 122. The fixation member 106 is fixed to the snowmobile ski 150 with attachment means, such as bolt 114 and nut 116. The bushing 156 is inserted in the opening 152 of the ski and in the opening 151 of the fixation member 106. As shown in FIG. 9, the bushing 156 is preferably fixed to the fixation member 106. This configuration allows the distribution of the forces in the reinforced portion of the ski and preserves the structural integrity of the ski 150. It has been found in experimentation that the kingpin is more subject to deformation without the use of the bushing 156. The bushing 156 may have an hexagonal head improving the tightening between the side of the snowmobile ski 150 and the fixation member 106.

In this second embodiment, the spring 108 is of mainspring type. A mainspring is typically a spiral spring of metal ribbon. Winding, or twisting the spiral tighter, stores energy in the mainspring. Also, in this second embodiment, the kingpin comprises a kingpin member 182 which comprises a body portion. The body portion comprises a first and a second extremity, a head portion located at the first extremity and a threaded portion located on the outer surface of the body portion. The kingpin also comprises a bushing 156. The bushing 156 comprises a hollow body portion having a first and a second extremity, a head portion located at the first extremity of the bushing 156 and a threaded portion 117 located on the outer surface of the body portion adjacent to the second extremity of the bushing 156. Furthermore, the second extremity of the bushing 156 typically does not extend beyond the outer side of the first opening. In addition, the kingpin generally comprises a securing member 144. The securing member 144 comprises a threaded body and a head located at one extremity of the threaded body 117. The kingpin member 182 of the kingpin is typically received through the hollow body portion of the bushing 156, wherein the second extremity of the kingpin is secured by the securing member 144 and wherein the kingpin member 182 is configured to be inserted through a first opening in the snowmobile ski 150. The securing member 144 typically comprises a hollow body. The inner surface of the hollow body of the securing member 144 is threaded and the hollow body of the securing member 144 is configured to receive the compatible threaded portion of the kingpin member 182.

The pivoting member 104 is rotatably connected to the fixation member 106 with the shaft 118. In this embodiment, the shaft 118 is screwed to the fixation member 106 and allows the pivoting member 106 to rotate along the shaft 118. The wheel 102 is rotatably fixed to the pivoting member 104 with the wheel shaft 188. A washer 142 is installed between the wheel 102 and the bolt head of the wheel shaft 188.

The case 180 comprises the spring 108. The spring 108 is an elongated strip made from a resilient material having rigidity, such as steel for example, that is rolled on itself. The case 180 comprises an opening 181 configured to received the cylindrical part 186. The spring 108 comprises a first hook 194 and a second hook 196. The first hook 194 is retained by the slot 197 of the cylindrical part 186. The second hook is retained by the extension 198 extending from the fixation member. The tension in the spring is adjusted by modifying the number of loops of the strip. To obtain a higher tension in the spring, the spring is rotate to create more loops.

The hooks 194 and 196 are a folded portion of the strip allowing the spring 108 to be retained by the slot 197 and the extension 198. It is to be noted that the strip could be retained otherwise, with a supplementary part for example or by using other appropriate means.

A stopper 144, also previously referred to as a securing member, is connected, screwed in this preferred embodiment, to the extremity of the bushing 156 extending on the other side of the fixation member 106. The stopper 144 allows the securing of the kingpin 182 holding the arm of the ski. An o-ring 146 is preferably installed on the stopper 144. As shown more specifically in FIG. 10, the pivoting member 104 comprises an extension 192 forming an arcuate portion 190. The arcuate portion is configured to mates the stopper 144 and the o-ring 146. The stopper 144 could be installed elsewhere on the system, for example on the fixation member, without departing from the scope of the present invention.

The spring 108 is maintained in a compressed state by retaining its extremities in the slot and the extension, creating a rotational force on the pivoting member 104. This rotational force allows the wheel to stay in a retracted configuration as shown in FIG. 13, and allows the wheel to return automatically from the extended configuration to the retracted configuration when the snowmobile returns on a snowy zone.

To move the wheel 102 in an extended configuration prior to circulate in an non-snowy zone or lightly snowy zone, the use pushes on the pivoting member to move the wheel 102 in an extended configuration as shown in FIG. 12. The user applies a force sufficient to overcome the tension of the spring. This will position bottom part the wheel 102 at a horizontal level lower than the undersurface of the ski 150. The wheel is then in contact with the ground and is maintained in this configuration under the weight of the snowmobile. It is possible to adjust the distance between the bottom of the wheel 2 and the undersurface of the ski 50, by using pieces having different dimension, for example. This distance may be of 1 inch or 2 inches, for example.

While the user goes back in a snowy zone, the non-snowy surface is gradually or suddenly replaced by a snowy surface. When there is enough snow under the ski 150, i.e. more than the distance between the ski 150 and the bottom of the wheel 102, the tension in the spring 108 will cause the wheel to go back in a retracted configuration. The tension in the spring 108 has to be adjusted to bring back the wheel in a retracted configuration. It is possible to adjust the tension according to the show condition. For example, if the snow is dense or hard, it is possible to adjust the tension in the spring 108 to obtain a higher retraction force to insure that the wheel will go back in a retracted configuration.

Figure 23:
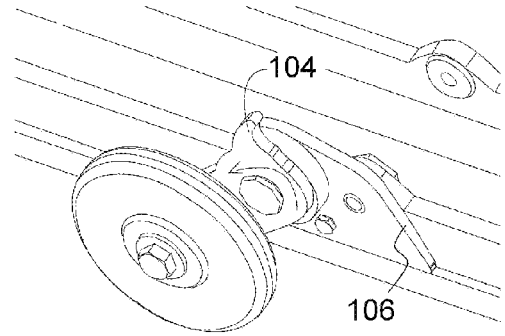
FIG. 23 shows another step to mount the second embodiment of the retractable wheel system on a snowmobile ski.
Figure 24:
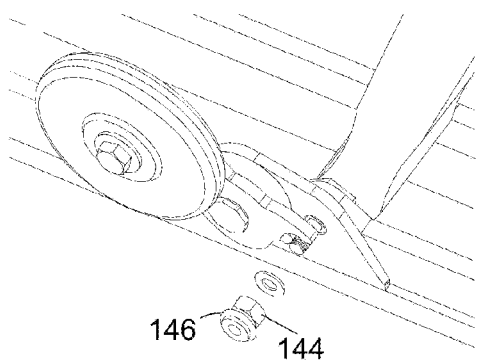
FIG. 24 shows another step to mount the second embodiment of the retractable wheel system on a snowmobile ski.
Figure 25:
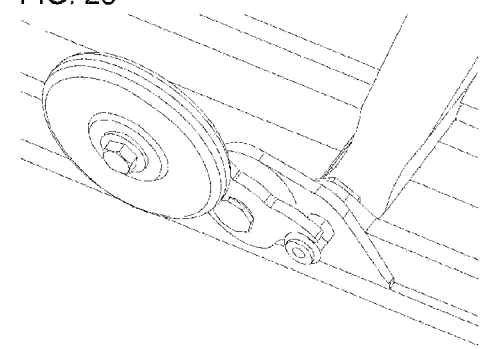
FIG. 25 shows another step to mount the second embodiment of the retractable wheel system on a snowmobile ski.

Referring now to FIGS. 14 to 25, to install the retractable wheel system, the kingpin 182 of the snowmobile ski and the arm 178 are dismounted from the ski and the piece 184 is removed. The bushing 156 is installed where the piece 184 has been removed. The kingpin 182 is the inserted through the arm 178 and through the installed bushing 156, thereby mounting the arm 178 to the snowmobile ski. The retractable wheel system 100 is fixed to the ski using the fixation member 106. In an embodiment using the bushing 156, the fixation member 106 is fixed to the ski using the bushing 156. The spring 108 is wind up by rotating the pivoting member 106 counterclockwise in the embodiment shown, as shown in FIG. 23. The pivoting member 106 is turned a predetermined number of times corresponding to the desired tension to be transferred to the spring. The stopper 144 is then installed to prevent the spring to unwind.

FIGS. 26a, 26b, 26.1a, 26.1b and 26.2a show another embodiment of a shaft 220 used with the first embodiment of the retractable wheel system illustrated in FIG. 1. To pass from the retracted configuration to the extended configuration, the spring 8 rotates on its longitudinal axis, causing a small longitudinal elongation of the spring 8. Even if the elongation is small, the stress induced on the retaining ring 37 may be enough to dislodge it from the groove 245. The second embodiment of the shaft 220 provides a solution to this problem. The slot 233 is configured to receive the first extremity 28 of the spring 8. As shown in FIG. 26.2a, there is an angle π between the bottom 235 of the slot and the top 237 of the slot. The walls 239 and 241 are not at a perpendicular angle relatively to the surface 243 of the shaft. This configuration forces the first extremity 28 of the spring 8 to stay in the bottom portion of the slot 233. It is to be noted that this shaft could be use in other application such as with a transmission arm on which a spring is connected.

The angle π may vary between 8° and 15°, more preferably between 10° and 14°. It has been found during experimentation that an angle of 12° provides better results.

The material of the parts of the retractable wheel system are resistant to impacts, winter conditions, principally. For example, the structure of the system may be made from composite, aluminium, steel, or other alloys. The spring is typically made from steel. The case may be made from a variety of materials, for example composites, metal or metal alloy or from plastics. The case is preferably made from polyethylene (UHMW). The wheel is preferably made from a resilient material that is resistant to cold temperatures, as known in the art.

It is to be noted that the tension in the spring is not the same in the retracted configuration and in the extended configuration. Indeed, when the wheel is in an extended configuration, it induces a supplementary tension in the spring. In the retracted configuration, the tension is at least sufficient to maintain the wheel in the retracted configuration. In the retracted configuration, the tension may be of 5 to 15 lbs for example. In the extended position, the tension may go up to 15 to 20 lbs.

It is to be noted that the different parts of the retractable wheel system may be unitary, or they may be assembled by using known means in the art, such as welding, screws, rivets, etc. . . .

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A shaft to be used with a spring comprising a first and a second extremity, the shaft having an axis, wherein the shaft comprises:
   a) a first and a second extremity;
   b) a slot extending into one of the first and second extremities of the shaft, the slot comprising a top portion and a bottom portion, the slot being configured to receive the first extremity of the spring;
   wherein the slot is configured to force the first extremity of the spring towards the bottom portion of the slot when the spring is twisted to be tighter.

2. A shaft as described in claim 1, wherein the slot extends substantially axially.

3. A shaft as described in claim 2, wherein the bottom portion and the top portion of the slot defines an angle therebetween.

4. A shaft as described in claim 3, wherein the spring is configured to be comprised in a case.

5. A shaft as described in claim 4, wherein the shaft is configured to be inserted in an adapter, wherein the adapter comprises a groove configured to receive the first extremity of the spring.

6. A shaft as described in claim 5, wherein the first extremity of the shaft is configured to be connected to a connector having a plurality of holes, the connector configured to receive the second extremity of the spring.

7. A shaft as described in claim 2, wherein the slot is substantially perpendicular to the second extremity of the shaft.

8. An actuator for placing a snowmobile ski wheel in contact with a surface, wherein the actuator extends from a wheel shaft and is configured to place the snowmobile ski wheel in contact with the surface, wherein the actuator is transverse to a ski.

9. An actuator as described in claim 8, wherein the actuator is activated with a foot.

10. An actuator as described in claim 9, wherein the wheel is configured to adjust the distance between bottom of the wheel and an undersurface of the snowmobile ski.

11. An actuator as described in claim 8, wherein the actuator extends outwardly from the wheel shaft.

12. An actuator as described in claim 8, wherein the actuator extends outside of and area defined by a vertical projection along a perimeter of the ski.

13. An actuator as described in claim 8, wherein the actuator is parallel to the wheel shaft.

14. An actuator as described in claim 8, wherein the actuator has a longitudinal axis coaxial with a rotation axis of the wheel.

15. A method to place a snowmobile ski wheel in contact with the ground, wherein the method comprises the steps:
   a) to downwardly push on an actuating member extending from the wheel shaft with a sufficient force allowing the wheel to be place in contact with the ground, the actuating member being transverse to a ski; and
   b) to maintain the wheel in contact with the ground using the weight of the snowmobile.

16. The method to place a snowmobile ski wheel in contact with the ground as described in claim 15, wherein the step to downwardly push on an actuating member produces sufficient force to overcome the resistance of a shaft comprising a slot to be used with a spring configured to force a first extremity of the spring towards the bottom portion of the slot when the spring is twisted to be tighter.

17. The method to place a snowmobile ski wheel in contact with the ground as described in claim 16, wherein the weight of the snowmobile produces a force greater than the tension in the spring.

* * * * *